United States Patent
Wier

(10) Patent No.: US 6,299,211 B1
(45) Date of Patent: Oct. 9, 2001

(54) TENSIONER FOR A SAFETY BELT

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/065,160

(22) Filed: Apr. 23, 1998

(30) Foreign Application Priority Data

Apr. 23, 1997 (DE) .......................................... 297 07 352 U

(51) Int. Cl.[7] .................................................. B60R 22/36
(52) U.S. Cl. .................... 280/806; 280/805; 280/741; 297/480; 60/638; 74/500.5
(58) Field of Search ............... 74/500.05–502.6; 280/805, 806, 741; 60/638; 297/480; 188/1 C

(56) References Cited

U.S. PATENT DOCUMENTS

| | | | |
|---|---|---|---|
| 3,917,031 | * 11/1975 | Doin et al. .......................... | 188/1 C |
| 3,957,281 | * 5/1976 | Pech ................................... | 280/744 |
| 4,288,098 | * 9/1981 | Tsuge et al. ........................ | 280/806 |
| 4,422,669 | * 12/1983 | Chiba et al. ....................... | 280/806 |
| 4,441,738 | * 4/1984 | Tsuge et al. ........................ | 280/806 |
| 4,573,322 | * 3/1986 | Fohl ................................... | 60/638 |
| 5,207,618 | * 5/1993 | Nishizawa ........................... | 474/101 |
| 5,340,152 | * 8/1994 | Fohl ................................... | 280/805 |
| 5,350,194 | 9/1994 | Fohl . | |
| 5,411,291 | 5/1995 | Fohl . | |
| 5,468,019 | * 11/1995 | Blase et al. ........................ | 280/805 |
| 5,495,790 | 3/1996 | Greiner . | |
| 5,876,063 | * 3/1999 | Wier .................................. | 280/741 |
| 5,879,027 | * 3/1999 | Wier .................................. | 280/806 |
| 5,908,222 | * 6/1999 | Wier .................................. | 297/480 |
| 5,927,756 | * 7/1999 | Wier .................................. | 280/806 |

FOREIGN PATENT DOCUMENTS

| | | |
|---|---|---|
| 9400764 | 4/1994 | (DE) . |
| 4307062 | 9/1994 | (DE) . |
| 0558963 | 9/1993 | (EP) . |
| 05193445 | 8/1993 | (JP) . |

* cited by examiner

*Primary Examiner*—Vinh T. Luong
(74) *Attorney, Agent, or Firm*—Tarolli, Sundheim, Covel Tummino & Szabo L.L.P.

(57) ABSTRACT

A tensioner for a safety belt has a piston/cylinder unit, which comprises a cylinder and a piston arranged in its interior, a compressed gas source, on the activation of which the piston is displaced, a belt engagement device which engages the safety belt, a traction cable which connects the piston to the belt engagement device, and at least one dampener for the absorption of energy on deceleration of the movement of the belt engagement device. The cylinder has a first end nearer to the belt engagement device and a second end further away therefrom. The piston consists of at least two piston parts, namely of a first, radially outer piston part and a second, radially inner piston part, the second piston part being uncoupled from the first piston part on deceleration of the piston at the end of the tensioning process.

19 Claims, 6 Drawing Sheets

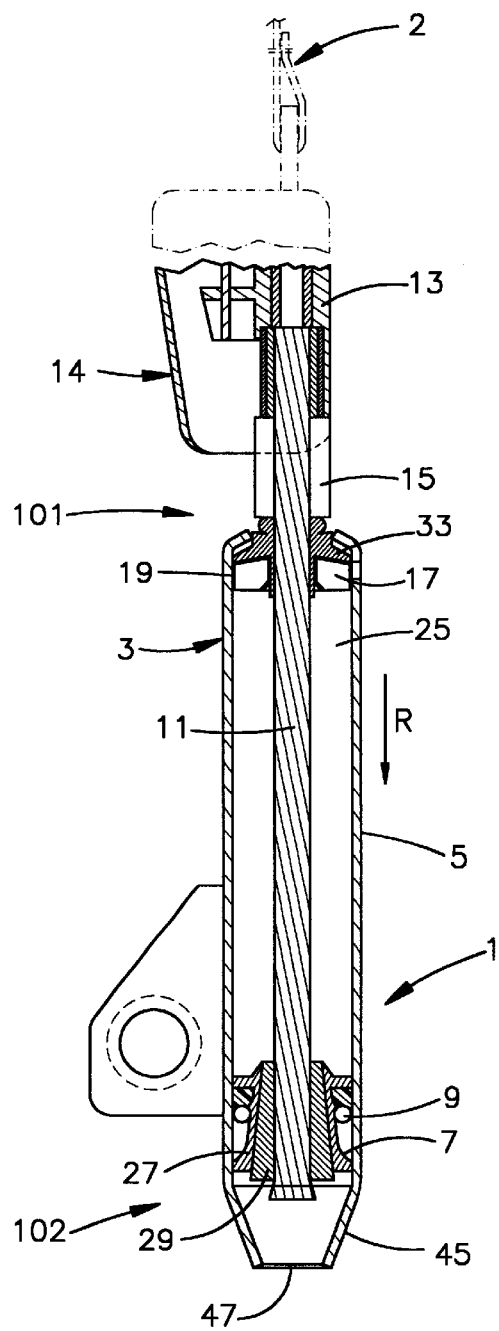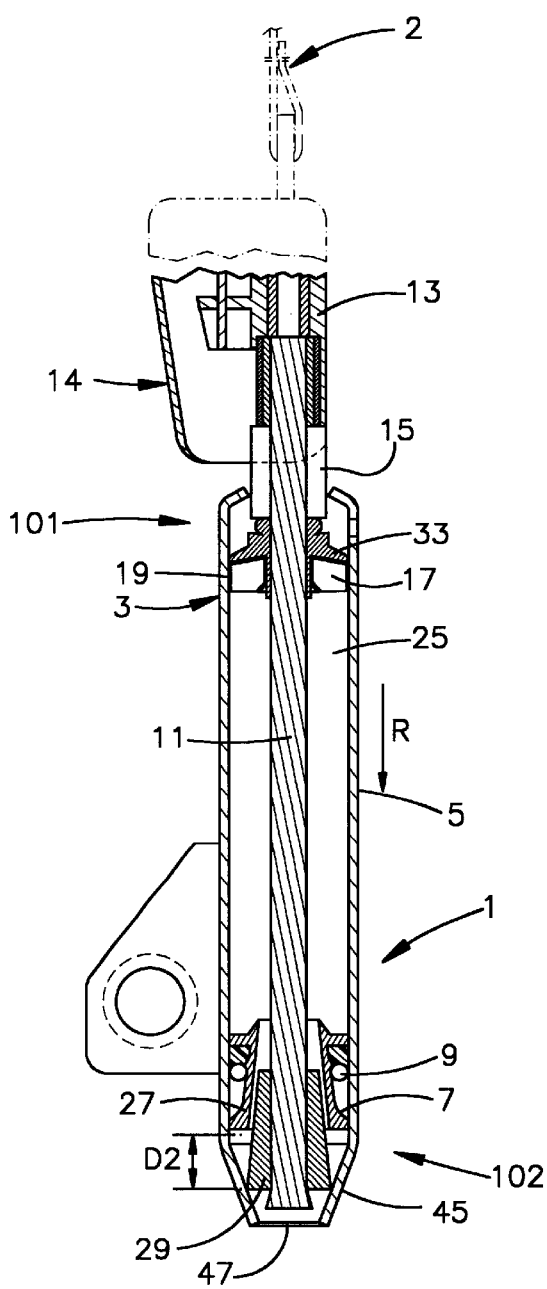

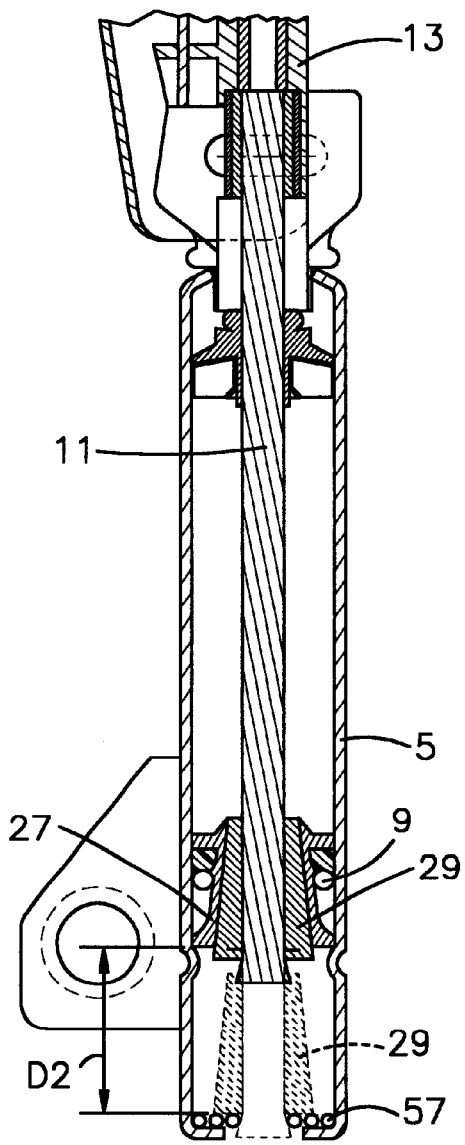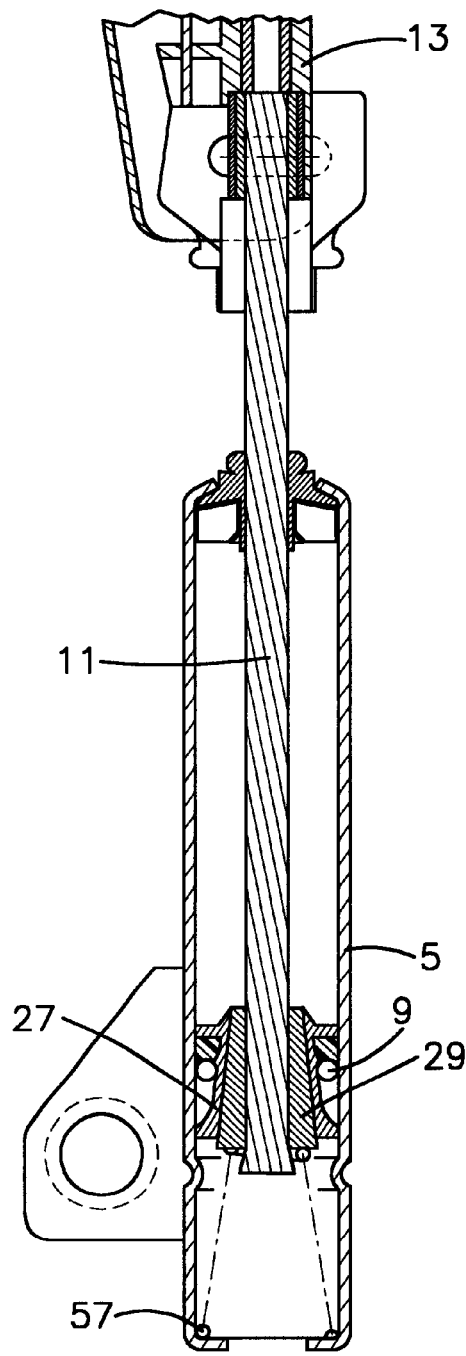

TENSIONER FOR A SAFETY BELT

TECHNICAL FIELD

The invention relates to a tensioner for a safety belt.

BACKGROUND OF THE INVENTION

Hereto known belt tensioners have a piston/cylinder unit, which comprises a cylinder and a piston arranged in its interior, and a compressed gas source, on the activation of which the piston is displaced. A belt engagement means which engages the safety belt is connected by a traction transfer means to the piston. A damping means provides for the absorption of energy on deceleration of the movement of the belt engagement means.

Tensioners for safety belts must be constructed as small as possible owing to the small space available in the vehicle. Inside or outside the cylinder, usually a damping means is provided, having a negative influence on the axial length of the tensioner, which damping means brakes the piston at the end of the tensioning way and in so doing absorbs energy, thus reducing load peaks. Owing to the length of the tensioning way and damping way necessary hitherto, known tensioners have such an axial overall length that they cannot be installed in the vehicle without a cable deflector.

BRIEF SUMMARY OF THE INVENTION

The invention provides a tensioner which, with the same tensioning way compared with known tensioners, is distinctly shorter in axial direction, without this being achieved at the expense of a poorer damping effect.

The tensioner according to the invention has a piston/cylinder unit, which comprises a cylinder with a cylinder jacket delimiting an interior of the cylinder and a piston arranged in the interior, and a compressed gas source, on the activation of which a tensioning process is initiated and the piston is displaced in a tensioning direction. Further, it comprises a belt engagement means which engages the safety belt, a traction transfer means which connects the piston to the belt engagement means, and at least one damping means for the absorption of energy on deceleration of movement of the belt engagement means. The cylinder has a first end nearer to the belt engagement means and a second end further away therefrom. The piston consists of at least two piston parts, namely of a first, radially outer piston part and a second, radially inner piston part. The second piston part is uncoupled from the first piston part on deceleration of the piston at the end of the tensioning process.

By uncoupling the piston parts on deceleration of the piston, it is possible to decelerate the piston parts independently from each other and to provide for their damping independently from each other. Accordingly, two or more damping means can be provided which, owing to uncoupling the two masses of the piston parts, can be constructed relatively small, because the mass which is to be decelerated or damped is smaller than with a piston having a single part. In addition, the tensioning process can proceed more quickly, because the damping ways for both piston parts which are to be decelerated are shorter than has been the case hitherto. Depending on when the damping of the second piston part occurs, the second piston part can run through the entire tensioning way also undamped and only be subsequently damped and decelerated. The first piston part, having a small mass, can be decelerated immediately before the end of the tensioning way on a short distance, so that the damping ways for the deceleration of the piston parts lie almost exclusively outside the tensioning way, therefore chronologically after the complete tensioning way has been covered by the piston parts.

In the preferred embodiment, at least one stop is provided for each of the first and the second piston parts each, the stop for the second piston part decelerating the latter chronologically after the impact of the first piston part. This means that the first piston part is already decelerated whilst the second piston part is still moving in the tensioning direction. When the second piston part is coupled with the traction transfer means and hence also with the belt engagement means, the mass of the first piston part, on braking, cannot exert any stress on the unit consisting of second piston part, traction transfer means and belt engagement means, so that, as a whole, the load peaks occurring in the traction transfer means can be kept small.

The stop for the first part can be formed by the end wall of the cylinder at the second end, a projection protruding on the inner side from the cylinder jacket or, according to a further preferred embodiment, by an jacket section of the cylinder, tapering conically, at its second end.

The stop for the second part, viewed spatially, can be provided in the tensioning direction after the stop for the first piston part or in front of it. In the latter case, a part connected to the traction transfer means strikes against the stop, which, for example, is the end wall at the first end of the cylinder. By a stop which is constructed in such a way, the second part and, if the traction transfer means and also the belt engagement means are fastened to it, the entire resulting unit can be damped, i.e. not decelerated abruptly.

According to one embodiment of the invention, the second piston part, the traction transfer means and the belt engagement means move on, after the deceleration of the first piston part, by a damping way and after the deceleration thereof, move back by at least a portion of the damping way contrary to the tensioning direction.

This return movement of the unit comprised of second piston part, traction transfer means and belt engagement means can occur by the forward movement of the vehicle occupant relative to the vehicle after the tensioning process or, when the vehicle occupant is not wearing his belt, by an elastic spring element which can be arranged inside the cylinder and moves the second piston part and thereby the belt engagement means back contrary to the tensioning direction at least by a partial distance after running through the damping way. The spring element has a dual function by having on the one hand a damping effect and, on the other hand, a restoring effect for the second piston part. When the belt engagement means is constructed as a belt buckle, it must be ensured after the tensioning is completed that the vehicle occupant can still actuate the release button of the belt buckle. This can be a problem when the belt buckle for example has dipped too deep between the back part and the seat part of a vehicle, as can be the case with tensioners for rear occupants of vehicles. The elastic spring element moves the belt buckle back by a certain distance, whereby the vehicle occupant can actuate the release button. The spring element offers a desired resistance to the pressing of the release button, so that the belt buckle assumes a stable position and is not displaced.

In the preferred embodiment, the end wall on the second end of the cylinder has an opening or it is completely open, so that an actual end wall is no longer present. After the second piston part is uncoupled from the first piston part, the traction transfer means and/or the second piston part extend into the opening or even to outside the piston, so that axial construction space can be saved. As the tensioner is usually arranged a few millimeters or even centimeters in front of a component on the vehicle side, which is usually formed by the floor of the vehicle or a carpet on the floor of the vehicle, in the case of restraint this intermediate space can be further utilized as a whole for extending the tensioning way. The traction transfer means or the second part can partially project into this intermediate space and fill it, so that a portion of the damping way can lie outside the cylinder and the tensioning way to be covered within the cylinder by the piston can be extended.

Owing to the saving of space which is able to be achieved by the invention, it is possible to accommodate the belt tensioner in the vehicle without a cable deflector.

The tensioner according is further characterized in that the sleeve is made of steel and the cone is made of a light metal or of a non-ferrous metal which is easily formable.

Furthermore, separate damping means may be provided for the piston parts.

BRIEF DETAILED DESCRIPTION OF THE DRAWINGS

FIG. 2 shows the tensioner shown in FIG. 1 after covering the entire tensioning way;

FIG. 3 shows the tensioner shown in FIGS. 1 and 2, in which the belt buckle with the traction cable moves beyond the tensioning way in the direction towards the floor of the vehicle;

Figure 4:
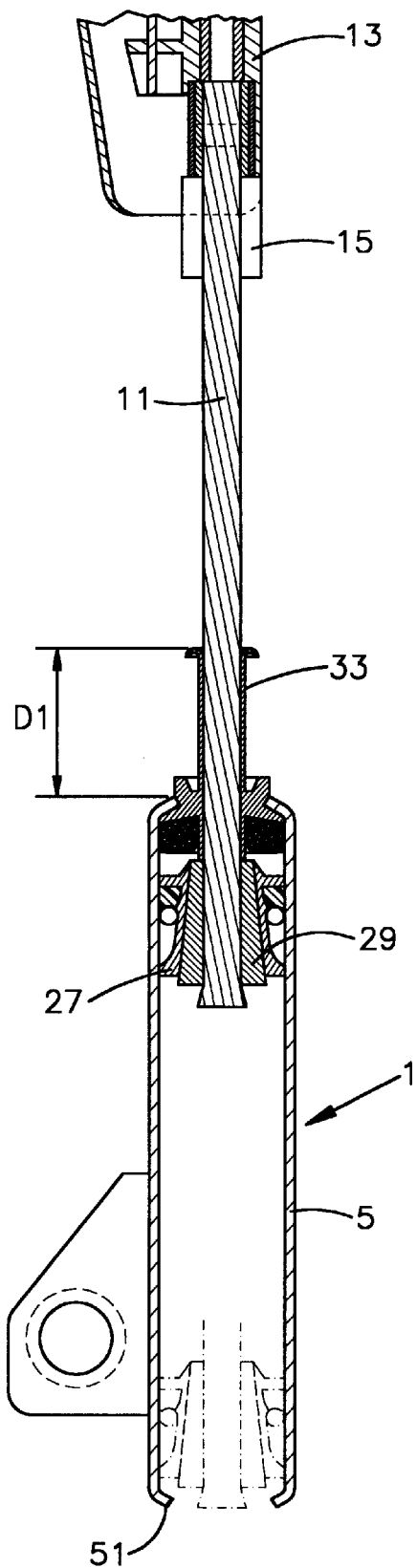
FIG. 4 shows a longitudinal sectional view of a second embodiment of the tensioner according to the invention in a non-actuated state, in which the second piston part can strike against the end wall at the second end of the cylinder.
Figure 5:
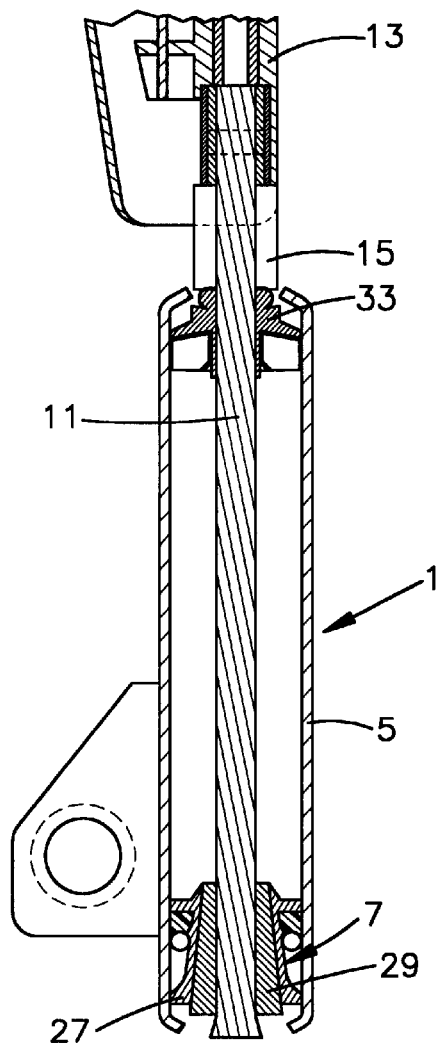
FIG. 5 shows a longitudinal sectional view through the tensioner shown in FIG. 4 after covering the tensioning way, corresponding to the state illustrated in FIG. 2.
Figure 6:
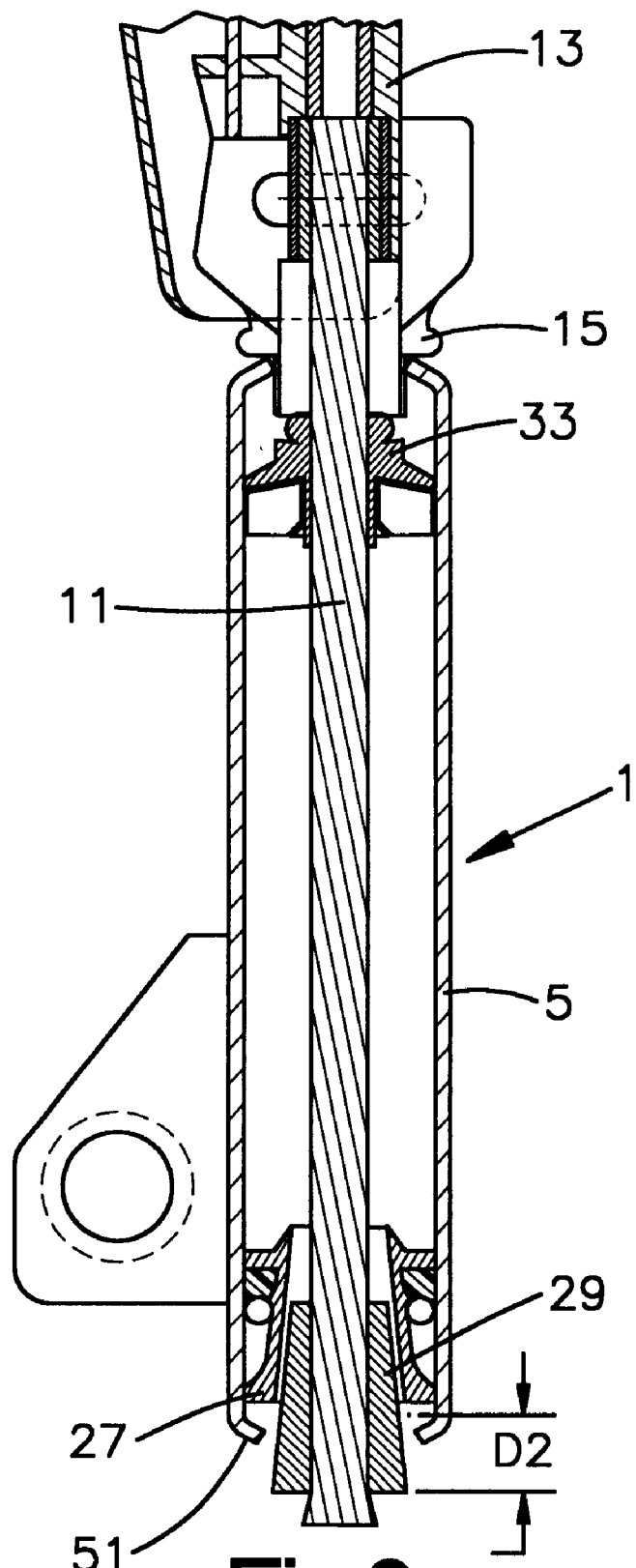
Figure 7:
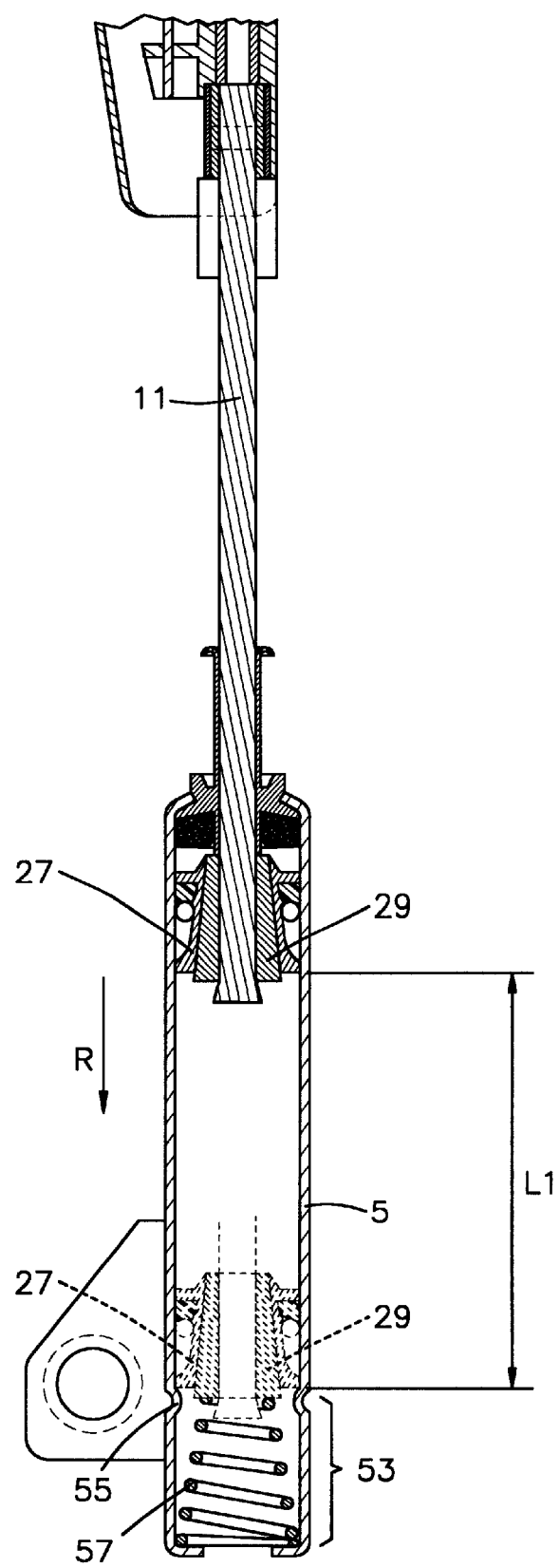

FIG. 6 shows the tensioner shown in FIGS. 4 and 5 at a moment after covering the tensioning way, when the belt buckle and the traction cable have moved further towards the floor of the vehicle, corresponding to the moment illustrated in FIG. 3; and FIGS. 7 to 9 show a further embodiment of the tensioner according to the invention in various phases which correspond to the phases shown in FIGS. 1, 2 and 3 or 4, 5 and 6, but here an elastic spring element being provided in the interior of the cylinder.

DETAILED DESCRIPTION OF PREFERRED EMBODIMENTS

Figure 1:
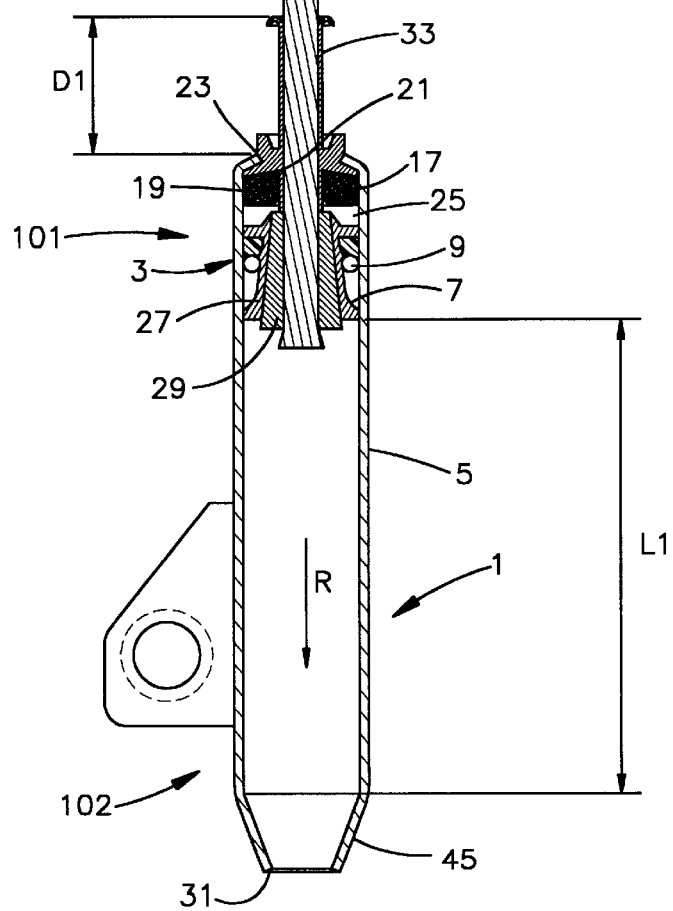
FIG. 1 shows a first embodiment of the tensioner according to the invention in longitudinal sectional view in a nonactuated state.

In FIG. 1 a tensioner 1 is illustrated, more precisely a linear buckle tensioner for a safety belt 2. The tensioner comprises a piston/cylinder unit 3, consisting of a cylinder 5 and a piston 7 displaceably arranged in the interior of the cylinder, with conventional locking elements 9 on its partially conical external contour. A traction transfer means 11 in the form of a traction cable is fastened to the piston 7, which traction cable at its opposite end is arranged on B1 a belt engagement means 13 in the form of a belt buckle by means of a cable press part 15. A compressed gas source 17 is arranged inside the cylinder at the first end 101 of the cylinder 5 facing the belt engagement means 13. The compressed gas source 17 has a hollow ring-shaped housing 19, which is filled with propellant. The traction transfer means extends through a central opening 21 in the housing 19 up to the piston. The housing 19 adjoins an end wall 23 of the cylinder 5, which serves as a seal between the interior of the cylinder 5 and the exterior. Between the piston 7 and the end wall of the housing 19 nearer to the piston 7, a working space 25 is formed, into which gas flows after ignition of the propellant inside the compressed gas source 17, which leads to a displacement of the piston 7 together with the traction transfer means 11 and the belt buckle 13 in tensioning direction R. L1 designates the maximum tensioning way.

The tensioner shown in FIG. 1 is constructed very short in the axial direction. This is achieved on the one hand in that the traction transfer means 11, compared with the length of the cylinder 5, is constructed so short that the cable press part 15, in the case of restraint, penetrates into the interior of the cylinder and in so doing pushes the end wall 23, configured as a separately constructed part and connected to the cylinder 5 in a form-fitting manner, at the first end 101 of the cylinder into its interior. In addition, damping means of very small construction are provided, which do not lead to a substantial axial increase in construction space. These damping means act on different parts. The piston 7 is composed of several piston parts, namely of a first, radially outer piston part 27 in the form of a steel sleeve and of a second, radially inner piston part 29 in the form of an aluminum cone. The first piston part 27 has a central opening which is exactly adapted to the shape of the cone 29, so that no gas can flow between the two parts. The second piston part 29 is connected to the traction transfer means 11, which at the lower end still slightly projects axially over the second piston part. Also between the second piston part 29 and the traction transfer means 11 no leakage gas flows can occur when compressed gas flows into the working space 25 of the cylinder. As the second piston part 29 tapers towards the first end of the cylinder 5, the two piston parts 27, 29 remain connected to each other on flowing of gas into the working space 25, and the entire piston 7 moves towards the second end 102 of the cylinder 5.

The cylinder 5 has a jacket section 45 at its second end 102 tapering in a conical manner, the transition of which to the circular cylindrical jacket section forms a stop for the first piston part 27 and hence delimits the tensioning way L1. Before the piston part 27 strikes against the transition between the circular cylindrical and tapering jacket section 45 of the cylinder 5, a sleeve 33 formed on the end wall 23 at the first end 101 of the cylinder 5 is plastically deformed over the damping way D1 by the striking of the cable press part 15 and absorbs energy. This sleeve 33 cooperates with the cable press part as first damping means. In addition, the tapering jacket section 45 can also be slightly deformed plastically by the first piston part 27 striking on it, and can act as a second damping device. Upon deceleration of the first piston part 27 on striking onto the narrowing jacket section 45, the second piston part 29 is uncoupled from the first owing to the inertial mass of the second piston part 29, traction transfer means 11 and belt engagement means 13. The unit thereby materializing moves further downwards (cf. FIG. 3) until the second piston part 29 finally strikes against the jacket section 45. If the second piston part 29 is uncoupled from the first piston part 27 at the moment shown in FIG. 2 or shortly thereafter, the cable press part 15 tears the end wall 23 out from its seat on the cylinder 5 and pushes it into the interior of the cylinder 5, as shown in FIG. 3. Thereby, the gas in the working volume 25 is compressed and is blown into the open air via the resulting opening between the first and second piston parts 27, 29, because the cylinder has an open end wall at the second end 102.

The end wall 23, which is pushed into the interior of the piston, cooperates with the housing 19 as damping piston and like a pneumatic damping means. When the second piston part 29 strikes against the jacket section 45, the jacket section 45 or the second piston part 29 can be further deformed slightly and contribute to the damping. As the second piston part 29 is made of aluminum, it can be plastically deformed to a high degree when it strikes onto the jacket section 45 and can thereby absorb a high amount of energy. Apart from light metal, the second piston part 29 can also consist of an easily deformable non-ferrous metal such as brass or copper. The end of the traction transfer means projecting downwards with respect to the second piston part 29 projects into the opening 47 of the lower end wall of the cylinder, which is formed by the jacket section 45, or even projects out from it and can extend up to the floor of the vehicle. As the damping characterized by the damping way D2 only occurs after the deceleration of the first piston part 27, when the two piston parts are uncoupled from each other, these piston parts are decelerated by partially differing damping means. The overall mass of each part which is to be braked is thereby small, so that the damping means can be constructed small. By the uncoupling of the two piston parts from each other, the mass of the first piston part together with the locking elements 9 does not act on the traction transfer means 11 during deceleration, whereby, as is also aimed for, the load on the traction transfer means can be kept low and load peaks are avoided. As the damping way D2 is, in addition, passed through after the entire tensioning way has been covered, the latter can be covered quickly by the piston 7.

The vehicle occupant, who moves forward after the belt tensioning is completed, presses the belt buckle 13 together with the second piston part back to the position shown in FIG. 2, but not further, because the locking elements 9 prevent the piston 7 from being pushed back further against the tensioning direction R.

In the embodiment of the tensioner shown in FIGS. 4 to 6, the cylinder 5 is shorter than in the embodiments illustrated in FIGS. 1 to 3, because the second piston part 29, after the tensioning has been completed (FIG. 5), passes partially through the open end wall 51 of the cylinder (cf. FIG. 6). The damping way D2 therefore lies completely outside the cylinder in the space between the cylinder and an interference contour in the vehicle, which remains unused in known belt tensioners. In the embodiment illustrated in FIGS. 4 to 6, the end wall 51 forms the stop for the first piston part 27.

The embodiment of the tensioner illustrated in FIGS. 7 to 9 differs from that illustrated in FIGS. 4 to 6 in that the cylinder 5 is extended by a section 53 into which the second piston part 29 moves after detaching from the first piston part 27. An indentation forms the stop 55 for the first piston part 27. An elastic spring element 57 in the form of a conical spring serves on the one hand to a small extent for damping the traction transfer means 11 when the second piston part 29 detaches itself from the first (see the lower position of the piston 7 in FIG. 7). On the other hand, when the second piston part has moved by the damping way D2 (cf. FIG. 8) with respect to the first damping part 27 in tensioning direction R, the spring element 57 moves back for contact with the first piston part 27. When the vehicle occupant wishes to remove the safety belt after tensioning is complete, the elastic spring element 53 offers a resistance to a displacement of the belt buckle, so that it is prevented that the unlocking button on the belt buckle 13 can no longer be actuated because of the belt buckle being easily displaceable. This relates in particular to tensioners which are arranged on a rear bench seat and, after the tensioning process, would be situated between the seat- and back upholstery. The elastic spring element 57 moves the second piston part 29, after tensioning is completed, back into the position shown in FIG. 9. Compared with the position illustrated in FIG. 8, it can be seen that until the locking elements 9 operate, a slight displacement of the entire piston is still possible contrary to the tensioning position R.

What is claimed is:

1. A tensioner for a safety belt comprising:
   a cylinder including a cylinder jacket defining an interior of said cylinder;
   a piston arranged in said interior of said cylinder; and
   a compressed gas source, activation of said compressed gas source initiating a tensioning process by displacing said piston in said cylinder in a tensioning direction;
   a belt engagement means;
   a traction transfer means connecting said piston to said belt engagement means; and
   at least one dampening means to absorb energy upon deceleration of said belt engagement means;
   said cylinder having a first end nearer to said belt engagement means and a second end spaced further away from said belt engagement means,
   said piston including a first, radially outer piston part and a second, radially inner piston part, said first and second piston parts being coupled together when moving in the tensioning direction
   said first piston part and said second piston part being designed in a way that said second piston part moves in the tensioning direction relative to said first piston part and becomes uncoupled and spaced apart from said first piston part upon deceleration of said piston at the end of said tensioning process resulting in said first and said second piston parts being distanced from each other in said tensioning direction.

2. The tensioner according to claim 1, wherein a first stop is provided for said first piston part and a second stop is provided for said second piston part, said second stop for said second piston part decelerating said second piston part after said first piston part strikes said first stop for said first piston part.

3. The tensioner according to claim 2, wherein said second end of said cylinder has an end wall and wherein said first stop for said first piston part is formed by said end wall.

4. The tensioner according to claim 2, wherein said first end of said cylinder has an end wall, and wherein said belt engagement means has a member connected to said traction transfer means.

5. The tensioner according to claim 4, wherein said member strikes against said end wall of said first end of said cylinder.

6. The tensioner according to claim 1, wherein said second piston part is connected to said traction transfer means.

7. The tensioner according to claim 1, wherein said belt engagement means is a belt buckle and said traction transfer means is a traction cable.

8. The tensioner according to claim 1, wherein said first piston part has an outer envelope surface, and further including locking members which abut against said envelope surface of said first piston part, said locking members preventing a movement of said first piston part opposite to said tensioning direction.

9. The tensioner according to claim 8, wherein an elastic spring element in said interior of said cylinder is provided, which moves back said second piston part and thereby said belt engagement means contrary to said tensioning direction at least by a portion of said damping way after said damping way is covered.

10. The tensioner according to claim 9, wherein said spring element is a conical spring.

11. The tensioner according to claim 1, wherein said second piston part, said traction transfer means and said belt engagement means continues to move in a tensioning direction after the deceleration of said first piston part.

12. The tensioner according to said 11, wherein said second piston part moves back in a direction opposite said tensioning direction until said second piston part abuts against said first piston part.

13. The tensioner according to claim 1, wherein said stop for said first piston part is a projection protruding from the inside of said cylinder jacket.

14. The tensioner according to claim 13, wherein said projection is formed by pressing said cylinder jacket inwardly.

15. The tensioner according to claim 1, wherein said stop for said second piston part is formed by said end wall of said cylinder at the second end.

16. A tensioner for a safety belt comprising:
   a cylinder including a cylinder jacket defining an interior of said cylinder;
   a piston arranged in said interior of said cylinder; and
   a compressed gas source, activation of said compressed gas source initiating a tensioning process by displacing said piston in said cylinder in a tensioning direction;
   a belt engagement means;
   a traction transfer means connecting said piston to said belt engagement means; and
   at least one dampening means to absorb energy upon deceleration of said belt engagement means;
   said cylinder having a first end nearer to said belt engagement means and a second end spaced further away from said belt engagement means,
   said piston including a first, radially outer piston part and a second, radially inner piston part,
   said second piston part being uncoupled from said first piston part upon deceleration of said second piston part at the end of said tensioning process so that the first and second piston parts are distanced from each other in said tensioning direction,
   said second piston part being a cone having an outer conical contour and tapered towards said first end of said cylinder, said first piston part being a sleeve for receiving said cone, said sleeve having an opening complimentary to said outer conical contour of said cone.

17. The tensioner according to claim 16, wherein said cone closes said opening in a gas tight manner during said tensioning process.

18. The tensioner according to claim 16, wherein said cone moves out from said opening and frees at least a portion of said opening after deceleration of said sleeve.

19. A tensioner for a safety belt comprising:
   a cylinder with a cylinder jacket delimiting an interior of said cylinder,
   a piston arranged in said interior,
   a compressed gas source, on the activation of which a tensioning process is initiated and said piston is displaced in said cylinder in a tensioning direction,
   a belt engagement means,
   a traction transfer means which connects said piston to said belt engagement means,
   at least one damping means for the absorption of energy on deceleration of movement of said belt engagement means,
   said cylinder having a first end nearer to said belt engagement means and a second end further away therefrom,
   said piston including a first, radially outer piston part and a second, radially inner piston part,
   said second piston part being uncoupled from said first piston part on deceleration of said piston at the end of said tensioning process, and
   a first stop for said first piston part and a second stop for said second piston part, said stop for said second piston part decelerating said second piston part after said first piston part strikes said first stop for said first piston part,
   said cylinder having a conical, tapering jacket section at the second end of said cylinder, and
   said second stop for said second piston part comprising said conical, tapering jacket section of said cylinder at the second end of said cylinder.

* * * * *